United States Patent [19]

Funabashi

[11] Patent Number: 5,265,473
[45] Date of Patent: Nov. 30, 1993

[54] OSCILLATOR TYPE ACCELEROMETER

[75] Inventor: Hideo Funabashi, Tokyo, Japan

[73] Assignee: Japan Aviation Electronics Industry Limited, Tokyo, Japan

[21] Appl. No.: 889,278

[22] Filed: May 28, 1992

[30] Foreign Application Priority Data

Jun. 10, 1991 [JP] Japan .................................. 3-137980

[51] Int. Cl.$^5$ ............................................. G01P 15/09
[52] U.S. Cl. .............................. 73/517 AV; 310/365; 310/368; 310/327
[58] Field of Search ....... 73/517 AV, 517 R, DIG. 4; 310/329, 338, 357, 368, 365

[56] References Cited

U.S. PATENT DOCUMENTS

| | | | |
|---|---|---|---|
| 3,479,536 | 11/1969 | Norris | 310/8.5 |
| 3,486,383 | 12/1969 | Wyckoff | 73/517 |
| 4,104,920 | 8/1978 | Albert et al. | 73/517 AV |

Primary Examiner—Hezron E. Williams
Assistant Examiner—Michael Brock
Attorney, Agent, or Firm—Pollock, VandeSande & Priddy

[57] ABSTRACT

An elongated mass is extended from the center of a U-shaped support frame and oscillators are disposed between the mass and leg portions of the support frame. The oscillators each have a flat, plate-like configuration which oscillates in a distorted-sliding oscillation mode.

2 Claims, 3 Drawing Sheets

OSCILLATOR TYPE ACCELEROMETER

BACKGROUND OF THE INVENTION

The present invention relates to an oscillator type accelerometer of the type wherein a mass is hingedly fixed to a support frame in a cantilever fashion, an oscillator is fixedly mounted on one side of the mass between its free end portion and the support frame at right angles to both the longitudinal direction of the mass and its turning axis, the free end portion of the mass is angularly displaced with respect to the support frame when acceleration is applied to the latter, and a change in the natural oscillation frequency of the oscillator by the angular displacement is detected to thereby detect the applied acceleration.

A description will be give first, with reference to FIGS. 1 and 2, of a prior art example on which the present invention is based. FIG. 1 schematically shows the overall structure of a conventional oscillator type accelerometer employing two oscillators. A support frame 11 is provided with a support portion 11c and leg portions 11a and 11b and is U-shaped as a whole. The support portion 11c has secured to the center thereof one end of a mass 12 through a thin hinge 13 so that the mass 12 extends in parallel to both leg portions 11a and 11b. In this example, the mass 12 has its one end coupled to the support portion 11c through the thin hinge 13 which spreads in a direction perpendicular to the plane containing the leg portions 11a, 11b and the support portion 11c of the support frame 11. Hence, the free end portion of the mass 12 can be displaced toward either of the leg portions 11a and 11b. Fixed at one end to the free end portion of the mass 12 are a pair of oscillators 14 and 15 which are secured at the other end to the leg portions 11a and 11b, respectively. As shown in FIG. 2, the oscillators 14 and 15 each have two parallel square-bar-shaped oscillatory portions 16 and 17 coupled to one another at both ends thereof, each having three electrodes 18 formed on each of its four surfaces lengthwise thereof. By applying an AC signal across the electrodes 18, the oscillatory portions 16 and 17 are caused to perform flexural oscillation in a direction perpendicular to their longitudinal direction in opposite phases to each other as depicted in FIG. 3. The oscillators 14 and 15 are usually quartz oscillators and they are excited at their natural oscillation frequency.

In FIG. 1, when an upward acceleration is applied to the support frame 11 as indicated by the arrow 19, the mass 12 is urged by inertia to move relative to the support frame 11 in a direction opposite to that indicated by the arrow 19, and hence is elastically displaced about the thin hinge 13. In this example the oscillator 14 receives a tensile stress and the oscillator 15 a compressive stress. As a result, the natural oscillation frequency of the oscillator 14 rises, whereas the natural oscillation frequency of the oscillator 15 lowers. The direction and magnitude of the applied acceleration can be detected by measuring the natural oscillation frequencies of the oscillators 14 and 15 and detecting the difference therebetween. The applied acceleration could be detected even with the use of only one of the oscillators 14 and 15, but when only one oscillator is employed, a bad influence is exerted on the performance of the accelerometer by a fluctuation in the natural oscillation frequency of the oscillator which is caused by an ambient temperature change in the case of no acceleration being applied. The use of two oscillator lessens such a bad influence.

The natural oscillation frequency of each oscillator used in the above-mentioned oscillator type accelerometer depends on the oscillation mode and configuration of the oscillator itself, and in the case of an oscillator of a flexural oscillation mode, its natural oscillation frequency is around 200 kHz at the highest. Since the oscillator type accelerometer detect the applied acceleration as a variation in the natural oscillation frequency of the oscillator, the resolution of the applied acceleration is dependent on the extent to which the frequency variation can be identified. In the case where the frequency variation is predetermined with respect to a fixed applied acceleration, it is necessary, for enhancement of the resolution, to improve the ability of identifying the frequency variation. In the oscillator type accelerometer utilizing the oscillators of the flexural oscillation mode, their natural oscillation frequencies are as low as 40 KHz or so and the frequency variation is also a maximum of only 8 KHz. In this instance, if the sampling time for measurement is assumed to be 1 sec, the resolution of acceleration is only 1/8000 of the maximum applied acceleration, and if a resolution in six figures is to be obtained, then it will be necessary that a carrier frequency mentioned below be higher than 1 MHz.

In the case where the variation in the natural oscillation frequency of each oscillator is low as mentioned above, it is customary in the prior art, for improving the frequency variation identifying ability and the resolution of the applied acceleration, to utilize a method which lengthens the sampling time for measurement or waveform-shapes the output waveform into a rectangular wave and then measures its pulse width or pulse interval. Needless to say, however, the method of increasing the sampling time is not preferable in that it involves the calculation of the mean value of the applied acceleration throughout the sampling time. On the other hand, the pulse width or pulse interval of the rectangular wave, into which the output waveform is shaped, is measured by counting high-frequency oscillation output pulses from an oscillation circuit of a frequency (a carrier frequency) sufficiently higher than the natural oscillation frequency of each oscillator. This method calls for very complex electric circuitry and the oscillation frequency stability of the oscillation circuit is related directly to the performance of the oscillator type accelerometer, and instability of the oscillation frequency often impairs the performance of the accelerometer.

Another prior art example of the oscillator type accelerometer is one that adopts air damping for producing a damping effect on the mass 12. In this case, air is sealed in the case of the accelerometer so that the damping effect is produced by the viscous friction of the air with the mass 12. When the oscillators 14 and 15 are of the flexural oscillation mode, they oscillate with relatively large amplitudes as shown in FIG. 3, and hence are subjected to the damping effect. Since the oscillation of the oscillators 14 and 15 is thus suppressed, their Q values decrease. If an oscillation circuit is formed using such oscillators as oscillation frequency determining elements, then stability of its oscillation frequency will lower. This leads to lowering of the performance of the oscillator type accelerometer, in particular, its resolution.

SUMMARY OF THE INVENTION

It is therefore an object of the present invention to provide an oscillator type accelerometer which is large in the variation of the oscillation frequency by the applied acceleration and small in the air damping effect on the oscillators. In the oscillator type accelerometer according to the present invention, as is the case with the prior art, a mass is hingedly secured to a support frame in a cantilever fashion, an oscillator is fixedly mounted on one side of the mass between its free end portion and the support frame at right angles to both the longitudinal direction of the mass and its turning axis, the free end portion of the mass is angularly displaced with respect to the support frame when acceleration is applied to the latter and a change in the natural oscillation frequency of the oscillator is detected to thereby detect the applied acceleration, but the oscillator is a flat plate-like one which oscillates in a distorted-sliding oscillation mode. The use of such a flat oscillator enhances the resolution of the oscillator type accelerometer, in particular, that one which adopts the air damping technique.

DESCRIPTION OF THE PREFERRED EMBODIMENT

Figure 1:
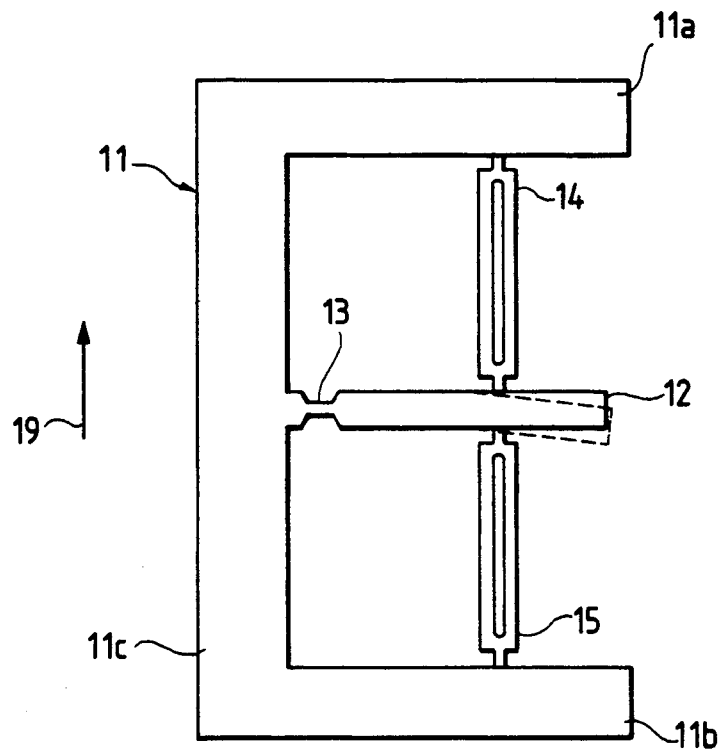
FIG. 1 is a front view showing the overall structure of a conventional oscillator type accelerometer employing two oscillators.
Figure 4:
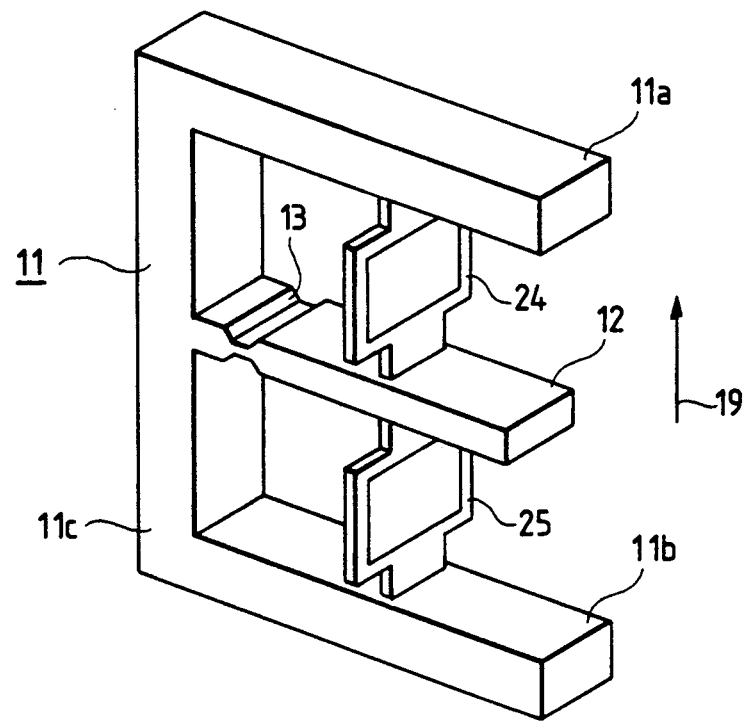
FIG. 4 is a perspective view illustrating the construction of the oscillator type accelerometer according to the present invention.
Figure 2:
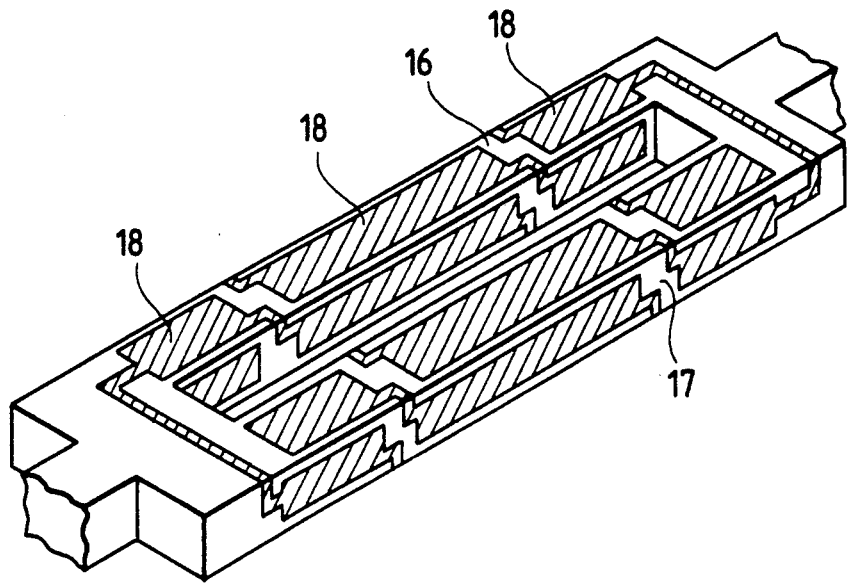
FIG. 2 is a perspective view of an oscillator of the flexural oscillation mode used in the accelerometer of FIG. 1.
Figure 3:
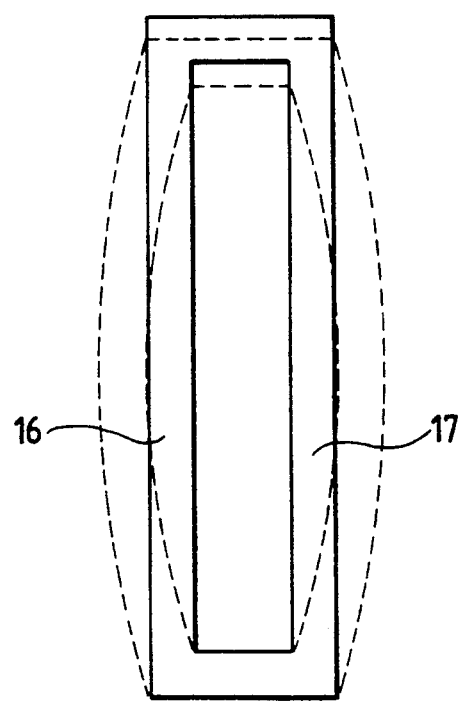
FIG. 3 is a diagram schematically showing the oscillation of the oscillator depicted in FIG. 2.

Referring now to FIG. 4, an embodiment of the present invention will be described. In this embodiment the support frame 11 and the mass 12 are identical in construction with those used in the prior art example of FIG. 1, hence no description will be given of them. While this embodiment is shown to include two oscillators 24 and 25 as in the case of the prior art example, either one of them may be omitted.

According to the present invention, the oscillators 24 and 25 are both formed so that they perform distorted-sliding oscillation. As seen from FIG. 5 which shows only the oscillator 24, it is formed by a flat plate-like crystal substrate provided with an oscillatory portion 24B of a parallelogram and a pair of coupling portions 24C extended from two opposite sides of the oscillatory portion 24B, and an electrode 24E is formed on each side of the oscillatory portion 24B. By applying an AC signal across the two electrodes 24E, the oscillatory portion 24B is caused to perform the distorted-sliding oscillation as indicated by the solid and broken lines in FIG. 6. The natural oscillation frequency of this kind of oscillator is on the order of tens of megahertz and the frequency variation in the oscillator type accelerometer can also be made on the order of 1000 KHz.

Figure 5:
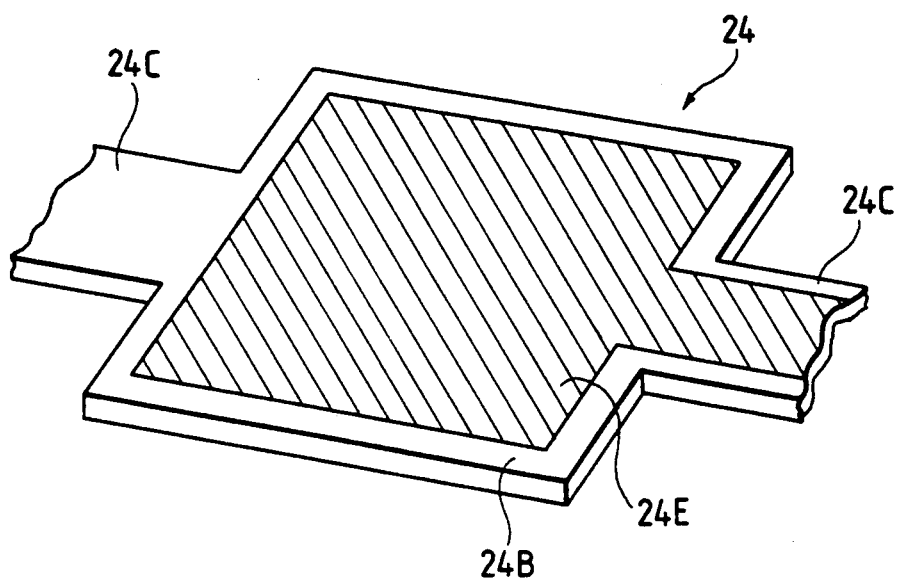
FIG. 5 is a perspective view of a flat plate-like oscillator of a distorted-sliding oscillation mode for use in the accelerometer of FIG. 4.
Figure 6:
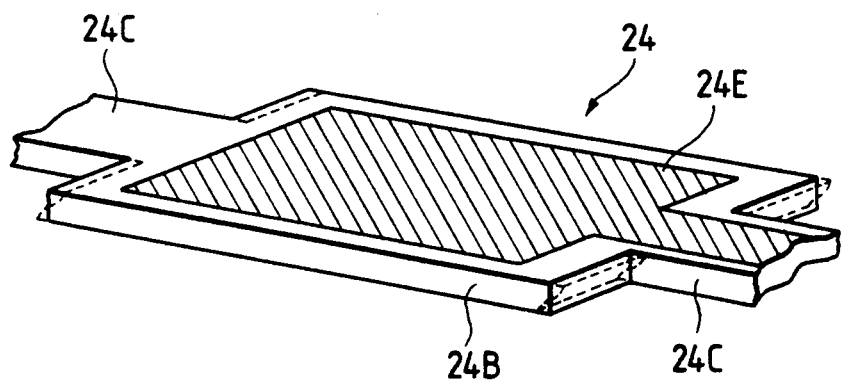
FIG. 6 is a diagram schematically showing the oscillation of the oscillator of the distorted-sliding oscillation mode depicted in FIG. 5.

As described above, the oscillator type accelerometer according to the present invention, shown in FIG. 4, employs, as each of the oscillators 24 and 25, an oscillator which performs the distorted-sliding oscillation referred to above in respect of FIG. 5. Upon application of an acceleration to the support frame 11 in the direction indicated by the arrow 19 when the oscillators 24 and 25 are being excited at their natural oscillation frequencies, a tensile stress is imposed on the oscillator 24, by which its natural oscillation frequency is increased from F1 to F1+$\Delta$f, whereas a compressive stress is imposed on the oscillator 25, by which its natural oscillation frequency is decreased from F1 to F1−$\Delta$f, as mentioned previously in connection with the prior art example. The applied acceleration can be known by detecting the difference, 2·$\Delta$f, between the natural oscillation frequencies of the oscillators 24 and 25.

As described previously, the natural oscillation frequency of the oscillator used in the oscillator type accelerometer is dependent on its oscillation mode and shape; the upper limit of the natural oscillation frequency of the oscillator of the flexural oscillation mode is about 200 KHz at the highest, the natural oscillation frequency of the oscillator actually used is as low as 40 KHz or so and the frequency variation is also only 8 KHz at the maximum. By the way, the natural oscillation frequency of the oscillator of the distorted-sliding oscillation mode, employed in the present invention, is as high as on the order of tens of megahertz, and in the case of using the oscillator in the oscillator type accelerometer, the frequency variation is up to 100 KHz or so, far higher than 8 KHz obtainable with the prior art. Accordingly, it is possible to improve the ability of identifying the variation in the natural oscillation frequency of the oscillator and the resolution of the applied acceleration. Thus, the present invention avoids the necessity of using a complex electric circuit provided with a high-frequency oscillation circuit and precludes the possibility of the oscillation frequency stability of the oscillation circuit impairing the performance of the oscillator type accelerometer.

Moreover, according to the present invention, since the oscillators 24 and 25 oscillate in the distorted-sliding oscillation mode, viscous friction between them and the air surrounding them does not essentially matter. Accordingly, also in the oscillator type accelerometer wherein air is sealed in the case of the accelerometer to produce a damping effect by the viscous friction of the air with the mass 12, if the oscillators 24 and 25 are of the distorted-sliding oscillation mode, then their oscillation will hardly be suppressed, and hence their Q values will not decrease. By forming an oscillation circuit using such an oscillator as an oscillation frequency determining element, the oscillation frequency of the oscillation circuit is so stable that the performance of the oscillator type accelerometer employing the air damping technique, in particular, its resolution can be enhanced.

It will be apparent that many modifications and variations may be effected without departing from the scope of the novel concepts of the present invention.

What is claimed is:

1. An oscillator type accelerometer comprising:
   a support frame;

an elongated mass one end of which is hingedly secured to said support frame, the other end of said elongated mass being a free end portion; and flat, plate-like oscillator means fixedly mounted on a side of said mass between said free end portion and said support frame at right angles to both the longitudinal direction of said elongated mass and its turning axis, said flat, plate-like oscillator means oscillating in a distorted-sliding oscillation mode;

wherein when an acceleration is applied to said support frame, said free end portion of said mass is angularly displaced with respect to said support frame and a change in a natural oscillation frequency of said oscillator means resulting from said angular displacement is detected to thereby detect said applied acceleration.

2. The accelerometer of claim 1 wherein a second oscillator means having substantially the same shape as said first mentioned oscillator means is fixedly mounted on another side of said mass between said free end portion and said support frame at right angles to both the longitudinal direction of said mass and its turning axis, said second oscillator means also oscillating in a distorted sliding oscillation mode.

* * * * *